July 12, 1949.  J. E. HORN  2,475,962
DETACHABLE SEAT CUSHION
Filed Jan. 8, 1947
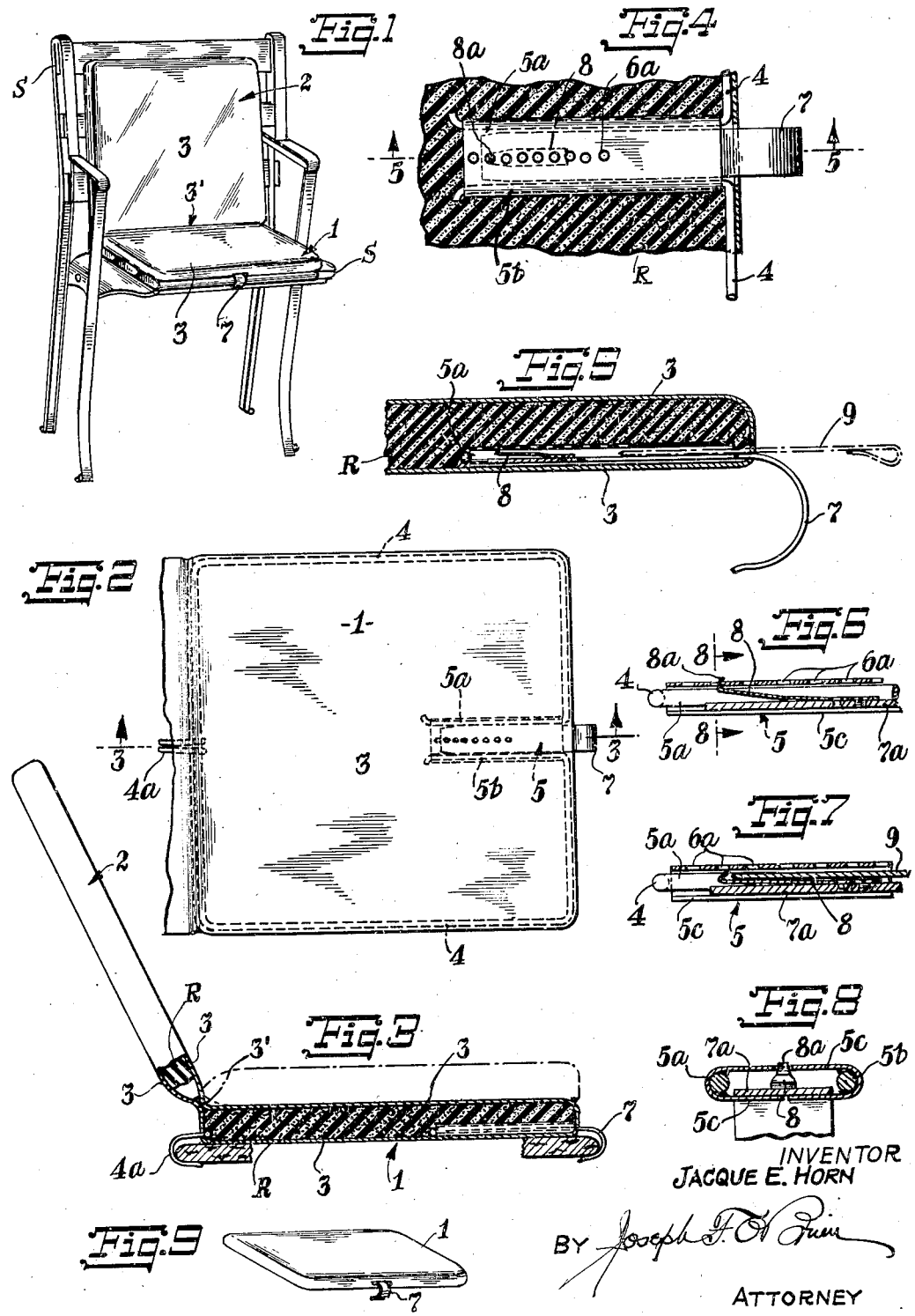
INVENTOR
JACQUE E. HORN
BY Joseph F. O'Brien
ATTORNEY Patented July 12, 1949

2,475,962

UNITED STATES PATENT OFFICE 2,475,962

DETACHABLE SEAT CUSHION

Jacque E. Horn, New York, N. Y.

Application January 8, 1947, Serial No. 720,828

2 Claims. (Cl. 155—131)

1

This invention relates to improvements in detachable seat cushions particularly adapted for cushioning seats in open stadiums at ball games or other sports events, and which is capable of being rapidly, easily and securely locked by a concealed frame and lock to the set or bench at the time of purchase and which remains securely locked to the seat until subsequently removed by an attendant who has a key.

One of the objects of my invention is the provision in a device of the character specified of a perimetric rigid frame provided at one edge, such as the back rail thereof, with an anchoring or fixed hook and at the opposite edge, such as the front rail thereof, with a lock-controlled hook adapted to be operated to fasten and lock the cushion to the seat.

Another object of my invention is the provision in a device of the character specified of a fixed lock casing combined with lock-hasp having an integral adjustable hook in a device that will be simple to operate in both application and removal, economic to manufacture and secure against unauthorized removal, tampering or theft of the cushion.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which—

Fig. 1 is a view in perspective of a seat, such as used in stadiums, having my seat cushion applied thereto;

Fig. 2 is a fragmentary view in plan of the seat portion of my cushion and showing the positions of the frame, hooks and lock thereof;

Fig. 3 is a section on the line 3—3 of Fig. 2;

Fig. 4 is an enlarged fragmentary view of my lock-casing, frame and the adjustable hook;

Fig. 5 is a section on the line 5—5 of Fig. 4, looking in the direction of the arrows;

Fig. 6 is an enlarged fragmentary view of the lock casing and locking member in locked position, the parts being removed from the cushion;

Fig. 7 is a view similar to Fig. 6 showing the lock casing with the locking member in released position;

Fig. 8 is a cross-section on the line 8—8 of Fig. 6; and

Fig. 9 is a modified form of seat cushion in which the back is omitted.

2

Referring now to these drawings, the device comprises a seat member 1 and a back member 2 adapted to be unfolded into the position shown in Figs. 1 and 3. The back is held in erected position merely by the back of the user and the parts 1 and 2 are connected together at 3' by a flexible hinge composed of the material of the container 3 which preferably is formed of an envelope of a tough flexible plastic-fabric material that will be readily cleansable and completely encloses and effectively contains a cushion of sponge rubber R. The container 3 is provided with a frame 4 shown in plan in Fig. 2 and this frame 4 is bent to extend perimetrically around the border of the cushion and to provide an integral rear anchor or hook 4ª. The frame 4 is, in itself, fitted within the container and is adapted to anchor and hold the flexible container in extended position and to stiffen the device as well as to provide a support for the sponge rubber pad so as to assist in holding the same in place within the container. Supported by the frame 4 at the middle portion of the front part of the seat cushion is a lock 5 connected to the frame by suitable joints 5ª and 5ᵇ. The lock casing is a sleeve-like member 5ᶜ having at the top edge a series of perforations 6ª and adapted to receive the slidable shank portion 7ª of a hook 7 which forms the hasp of the lock. Said shank 7ª is provided with a flat spring 8 having a pawl 8ª adapted automatically to slip inwardly and click over one or more of the holes 6ª but to prevent outward withdrawal until released by a key 9.

To release the hook 7, the key 9 is merely inserted between the top plate 5ª of the sleeve-like member 5 and the shank 7ª of the extensible hook 7. This insertion depresses the latch 8ª so as to permit the outward movement or withdrawal from the sleeve-like lock member 5 of the shank 7ª of the hook 7. A very simple extension and locking movement of the member 7 is thus provided. As the lock-casing 5ª is supported by the frame 4 and as the frame fits within the container 3 tightly and snugly, the entire seat cushion is securely locked in place on the seat or bench B.

Obviously, the user of the cushion has no control of the locking mechanism and the seat cushion is, in itself, a rigid though light article with an elastic upper seating surface and is so firmly attached to the bench or seat that the lock 5 which is entirely enclosed and concealed within the flexible container 3 and is supported by the rigid frame also concealed therein, that it will be impossible, without destruction of the container, for the user to remove the seat cushion when locked to a seat S. Furthermore, the back part of the seat cushion frame is firmly connected by an integral connection to the seat portion and, consequently, cannot without destruction, as aforesaid, be detached. When a game or other attraction in a stadium or the like is finished, an attendant goes around with a key and unlocks the seat cushions from the benches and takes them to a suitable repository. In devices of this kind it is important to have a secure and readily-operable lock which is preferably concealed and under the control only of the attendants who have a key preferably of a special or large type, and it is also important that the locking mechanism be inaccessible so that it cannot be operated without said key.

Seat cushions of the type specified are capable of being manufactured at a low predetermined cost and, when the container is made of the plastic fabric hereinabove referred to, all the edges may be sealed around the cushion in a single electrical-sealing operation which securely fastens and effectively seals the outer edges of the said fabric together in tightened condition about the cushion R and frame 3, leaving only small holes or apertures for the entrance into the container of the two hooks 4ª and 7, and also completely eliminating sewing and like costs.

In Fig. 9 I have shown a slight modification in which the back member 2 has been omitted. It is otherwise identical to the seat member of Figs. 1 to 8.

Having described my invention, I claim:

1. A detachable seat cushion comprising, in combination, a cushion, a rigid perimetric frame surrounding the border of said cushion, a fixed hook connected with said rigid frame at one end thereof, a lock-casing supported by and fixedly connected with the opposite end of said frame, an adjustable hook slidable within said lock-casing to permit locking and releasing of said frame to a seat, and a flexible container concealing said cushion, the rigid frame and container having restricted apertures for the projection therethrough of a portion of said fixed hook and for the movement therethrough of a portion of said movable hook, said concealed lock-casing comprising a tubular member having perforations and said adjustable hook having an integral shank portion provided with a spring-urged locking-member adapted to engage and lock within said perforations, and said spring-urged locking member being releasable from said perforations to permit movement of the adjustable hook and to enable removal of the seat cushion from the seat.

2. A detachable seat cushion as claimed in claim 1 in which the said spring-urged locking member comprises a flat spring mounted in normally raised position upon one surface of the shank of the adjustable hook and adapted upon sliding movement within the lock-casing to engage within one of the perforations of said tubular lock-casing, said spring-urged locking member being releasable by a member adapted to slide between the lock-casing and the shank and in a wedging action to depress the spring to permit extension or release of the adjustable hook from the lock casing.

JACQUE E. HORN.

REFERENCES CITED

The following references are of record in the file of this patent:

UNITED STATES PATENTS

| Number | Name | Date |
| --- | --- | --- |
| 819,482 | Wheeler | May 1, 1906 |
| 949,461 | Buch | Feb. 15, 1910 |
| 1,802,853 | Weltner | Apr. 28, 1931 |
| 2,092,666 | Dietrich | Sept. 7, 1937 |
| 2,248,413 | Rathbun | July 8, 1941 |